(12) United States Patent
Satyaseelan

(10) Patent No.: US 10,563,723 B2
(45) Date of Patent: Feb. 18, 2020

(54) INTEGRATED SLIP CLUTCH WITH DRIVE PLATE FOR DRY DAMPER APPLICATIONS

(71) Applicant: Schaeffler Technologies AG & Co. KG, Herzogenaurach (DE)

(72) Inventor: Ayyalraju Satyaseelan, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 433 days.

(21) Appl. No.: 15/057,617

(22) Filed: Mar. 16, 2016

(65) Prior Publication Data

US 2017/0268575 A1    Sep. 21, 2017

(51) Int. Cl.
| | |
|---|---|
| F16F 15/123 | (2006.01) |
| F16F 15/134 | (2006.01) |
| F16F 15/131 | (2006.01) |
| F16F 15/14 | (2006.01) |
| F16D 13/70 | (2006.01) |

(52) U.S. Cl.
CPC ........ *F16F 15/12366* (2013.01); *F16D 13/70* (2013.01); *F16F 15/13121* (2013.01); *F16F 15/13484* (2013.01); *F16F 15/145* (2013.01); *F16D 2013/703* (2013.01)

(58) Field of Classification Search
CPC .. F16D 3/12; F16D 2250/0084; F16F 15/123; F16F 15/12306; F16F 15/12353; F16F 15/1236; F16F 15/12366; F16F 15/134; F16F 15/13407; F16F 15/13469; F16F 15/13476; F16F 15/13484; F16F 15/13121

USPC ............. 464/68.1, 68.4, 68.41, 68.8
See application file for complete search history.

(56) References Cited

U.S. PATENT DOCUMENTS

| | | | | |
|---|---|---|---|---|
| 4,274,524 | A * | 6/1981 | Nakane | F16F 15/1397 192/214.1 |
| 4,809,830 | A * | 3/1989 | Schierling | F16F 15/12373 192/213.31 |
| 4,860,871 | A * | 8/1989 | Graton | F16F 15/1238 192/213.12 |
| 4,892,177 | A * | 1/1990 | Lanzarini | F16D 13/385 192/212 |
| 5,695,034 | A | 12/1997 | Graton et al. | |
| 5,935,008 | A * | 8/1999 | Mizukami | F16F 15/1397 192/214.1 |
| 5,984,789 | A * | 11/1999 | Reik | F16D 47/02 192/212 |
| 6,796,411 | B2 * | 9/2004 | Bauer | F16H 41/28 192/212 |
| 7,073,646 | B2 * | 7/2006 | Sasse | F16F 15/12366 192/213.1 |

(Continued)

FOREIGN PATENT DOCUMENTS

EP    2600030 A2 *    6/2013    ............ F16F 15/134

*Primary Examiner* — Josh Skroupa
(74) *Attorney, Agent, or Firm* — Davidson, Davidson & Kappel, LLC

(57) ABSTRACT

A drive assembly for a motor vehicle drive train includes a first subassembly configured for connecting to an engine crank. The first subassembly includes a slip clutch plate. The drive assembly also includes a second subassembly connected to the first subassembly via a radially outer portion of the slip clutch plate. The second subassembly includes a damper assembly. A method of forming a drive assembly for a motor vehicle drive train is also provided.

20 Claims, 2 Drawing Sheets

(56) References Cited

U.S. PATENT DOCUMENTS

| | | | | |
|---|---|---|---|---|
| 7,267,211 B2* | 9/2007 | Yamashita | F16F 15/12366 | 464/68.1 |
| 7,651,399 B2* | 1/2010 | Wack | F16F 1/04 | 464/67.1 |
| 7,743,900 B2* | 6/2010 | Breier | F16F 15/12373 | 464/68.1 |
| 7,819,751 B2* | 10/2010 | Ebata | F16F 15/1395 | 464/68.2 |
| 7,934,997 B2* | 5/2011 | Avins | F16D 7/027 | 464/10 |
| 8,135,525 B2* | 3/2012 | Swank | F16F 15/12353 | 701/69 |
| 8,210,950 B2* | 7/2012 | Nakagaito | F16F 15/13164 | 464/46 |
| 8,257,183 B2* | 9/2012 | Inoshita | F16F 15/1297 | 464/46 |
| 8,272,966 B2* | 9/2012 | Saeki | F16F 15/1297 | 464/46 |
| 8,398,492 B2* | 3/2013 | Takeshita | F16F 15/1297 | 464/68.41 |
| 8,403,762 B2* | 3/2013 | Steinberger | F16F 15/13492 | 192/3.29 |
| 8,414,404 B2* | 4/2013 | Takenaka | F16F 15/129 | 188/218 XL |
| 8,465,372 B2* | 6/2013 | Saeki | F16F 15/1297 | 192/214 |
| 8,534,440 B2* | 9/2013 | Sudau | F16D 3/14 | 192/70.12 |
| 8,647,211 B2* | 2/2014 | Doman | F16D 3/14 | 464/46 |
| 8,795,093 B2* | 8/2014 | Saeki | F16F 15/1295 | 464/68.41 |
| 8,814,708 B2* | 8/2014 | Odaka | F16D 7/025 | 464/46 |
| 8,881,515 B2* | 11/2014 | Lindemann | F16F 15/1343 | 60/338 |
| 8,893,867 B2* | 11/2014 | Sudau | F16D 25/0635 | 192/3.3 |
| 9,243,670 B2* | 1/2016 | Nakagaito | F16D 3/12 | |
| 9,470,290 B2* | 10/2016 | Hoffmann | F16F 15/13484 | |
| 9,618,054 B2* | 4/2017 | Hoffmann | F16F 15/13484 | |
| 9,657,823 B2* | 5/2017 | Lindemann | F16H 45/02 | |
| 9,732,835 B2* | 8/2017 | Kawahara | F16F 15/1421 | |
| 9,958,027 B2* | 5/2018 | Sekiguchi | F16F 15/173 | |
| 9,964,169 B2* | 5/2018 | Takeshita | F16F 7/02 | |
| 2010/0243404 A1* | 9/2010 | Saeki | F16F 15/1292 | 192/213.22 |
| 2011/0028225 A1 | 2/2011 | Jameson et al. | | |
| 2015/0005078 A1* | 1/2015 | Sekiguchi | F16H 45/02 | 464/24 |
| 2015/0345565 A1* | 12/2015 | Tomiyama | F16H 45/02 | 464/68.8 |

* cited by examiner

INTEGRATED SLIP CLUTCH WITH DRIVE PLATE FOR DRY DAMPER APPLICATIONS

The present disclosure relates generally to drive assemblies and more specifically to drive assemblies for dry applications.

BACKGROUND

Most hybrid damper applications include a torque limiting clutch packaged along with a damper. It becomes time consuming and expensive to design, develop and manufacture slip clutch components tailored for each and every application having similar performance requirements. Moreover, when the axial and radial space is very limited, it becomes extremely difficult to have an arrangement which provides the most effective functionality of the components, ease of installation at customer end as well as low cost manufacturing processes.

U.S. Pat. No. 5,695,034 discloses a damper having a low rate coil spring damper with a torque limiting clutch using cast components to meet packaging requirements.

U.S. Pub. 2011/0028225 discloses a slip clutch disposed between a damper and a flywheel for a hybrid vehicle. Friction material is applied directly to the diaphragm spring, and torque is transmitted through the diaphragm spring into the cover plates and out through the damper.

SUMMARY OF THE INVENTION

A drive assembly for a motor vehicle drive train is provided. The drive assembly includes a first subassembly configured for connecting to an engine crank. The first subassembly includes a slip clutch plate. The drive assembly also includes a second subassembly connected to the first subassembly via a radially outer portion of the slip clutch plate. The second subassembly includes a damper assembly.

A method of forming a drive assembly for a motor vehicle drive train is also provided. The method includes forming a first subassembly configured for connecting to an engine crank, the first subassembly including a slip clutch plate; forming a second subassembly including a damper assembly; and connecting to the first subassembly to the second subassembly via a radially outer portion of the slip clutch plate.

BRIEF DESCRIPTION OF THE DRAWINGS

The present invention is described below by reference to the following drawings, in which.

DETAILED DESCRIPTION

The disclosure provides a drive assembly including a torque limiting clutch packaged along with a damper assembly. The damper assembly includes an integrated slip clutch with drive plate, a production damper disc, and an inertia adding assembly. The integrated slip clutch drive plate includes a centering feature for the diaphragm spring and a spring flattening feature to ensure contact between spring and friction material, and is bolted to the engine crank and then to the damper (two separate modules). An alternative hybrid damper design is also disclosed with an integrated slip clutch drive plate connected to a low rate inline series coil spring damper. One of the intermediate flanges includes centering features on both the inner and outer diameters for ease of assembly.

Figure 1:
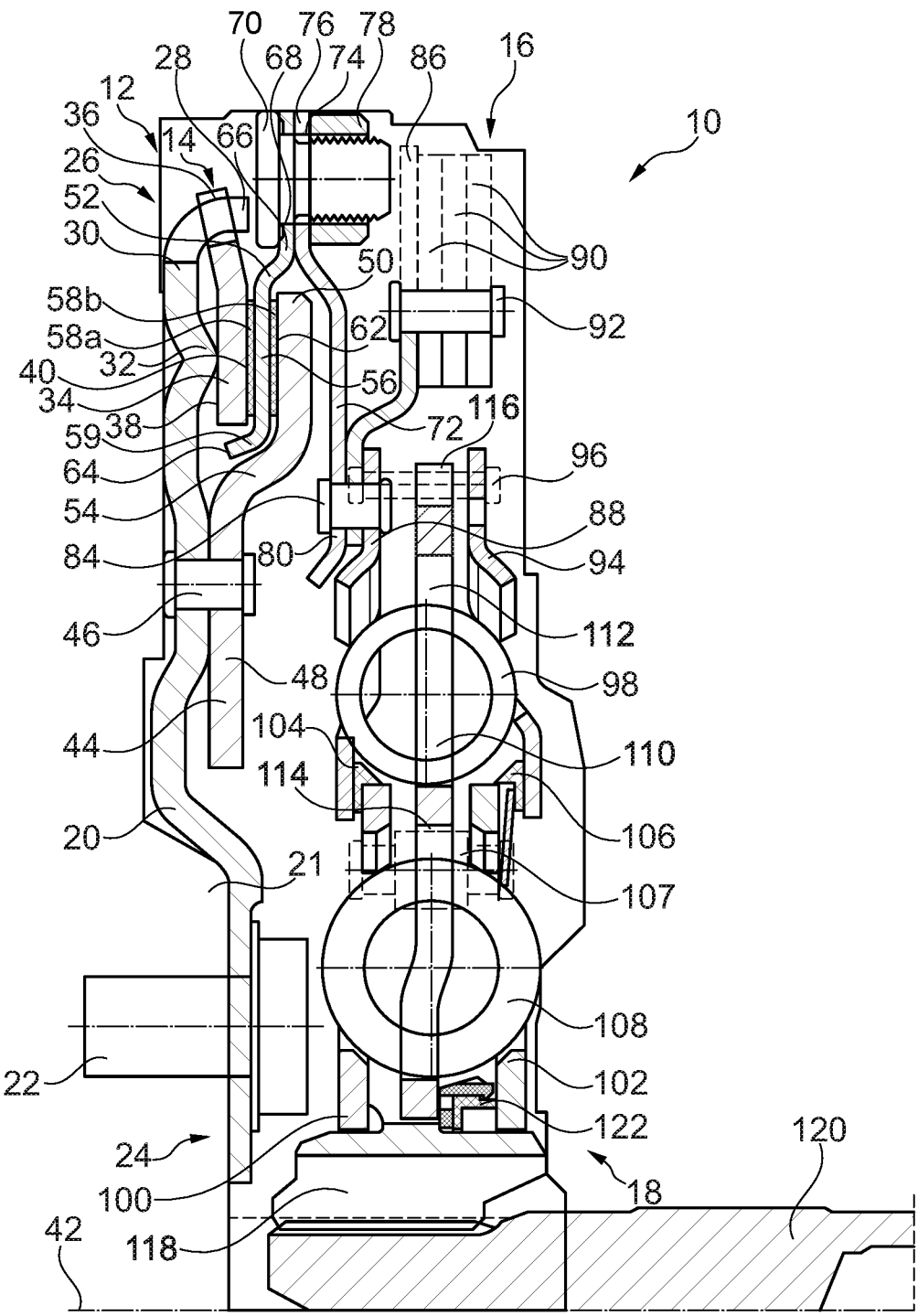
FIG. 1 shows a cross-sectional side view of a dry drive assembly for a motor vehicle drive train in accordance with an embodiment of the present invention.

FIG. 1 shows a cross-sectional side view of a dry drive assembly 10 for a motor vehicle drive train in accordance with an embodiment of the present invention. Drive assembly 10 includes a first subassembly 12 including a torque limiting integrated clutch 14 and a second subassembly 16 includes a damper assembly 18. First subassembly 12 includes a drive plate 20 for connecting to an engine crank 21 by a plurality of bolts 22, which pass through holes formed in radially inner end 24 of drive plate 20. At a radially outer end 26 thereof, drive plate 20 includes a plurality of axially extending tabs 28 extending axially away from the engine crank 21 and axially toward damper assembly 18. Radially inside of tabs 28, drive plate 20 further includes a radially extending portion 30 that merges into an annular protrusion 32 extending axially away from radially extending portion 30 and axially toward damper assembly 18.

Tabs 28 drivingly engage a diaphragm spring 34 via radially extending tabs 36 protruding radially outward at a radially outer end of diaphragm spring 34, which forms a biaser of first subassembly 12. An engine side radially extending surface 38 of diaphragm spring 34 contacts annular protrusion 32 such that protrusion 32 maintains diaphragm spring 34 in radial alignment so that a transmission side radially extending surface 40 of diaphragm spring 34 is aligned perpendicular to a center axis 42 of drive assembly 10 during slip clutch engagement. As used herein, the terms axially, radially and circumferentially are used with respect to center axis 42. First subassembly 12 further includes a slip clutch support plate 44 fixed to drive plate 20 by a plurality of circumferentially spaced connectors that are rivets 46 in this embodiment. Rivets 46 are radially inside of a slip clutch plate 52. Support plate 44 includes a radially inner portion 48, which is radially inside of annular protrusion 32, through which rivets 46 pass and a radially outer portion 50 for supporting slip clutch plate 52. Radially inner and outer portions 48, 50 each extend perpendicular to center axis 42, with an intermediate portion 54 extending axially from inner portion 48 in the direction of damper assembly 18 to outer portion 50.

First subassembly 12 further includes slip clutch plate 52, which is sandwiched axially between diaphragm spring 34 and outer radial portion 50 of support plate 44. Clutch plate 52 includes a radially extending central portion 56 having friction material 58a, 58b on both radially extending surfaces thereof. Friction material 58a is arranged for contacting radially extending surface 40 of diaphragm spring 34 and friction material 58b is arranged for contacting a radially extending surface 62 of support plate 44. Radially inside of central portion 56, clutch plate 52 includes an axially extending portion 59 having the same shape as intermediate portion 54 of support plate 44 and is positioned adjacent to intermediate portion 54 of support plate 44. Axially extending portion 59 includes a free end 64 that defines an innermost radial edge of clutch plate 52.

Radially outside of central portion 56, clutch plate 52 includes a radially outer portion 66 configured for connecting to second subassembly 16. More specifically, in this embodiment, radially outer portion 66 includes a plurality of holes 68, each for receiving one of a plurality of circumferentially spaced studs 70 that connect radially outer portion 66 to a connecting plate 72 of second subassembly 16.

During operation of drive assembly 10, clutch plate 52 is forced against support plate 44 by diaphragm spring 34 such that clutch plate 52 frictionally engages diaphragm spring 34 via friction material 58a and frictionally engages support plate 44 via friction material 58b to rotationally lock clutch plate 52 and drive plate 20 when the torque on drive plate 20 is less than a predetermined value. Once the torque on drive plate 20 reaches or exceeds the predetermined value, the forces exerted on clutch plate 52 exceed the force applied by diaphragm spring 34 and clutch plate 52 slips with respect to drive plate 20.

Connecting plate 72, at a radially outer portion 76 thereof, also includes a plurality of holes 74, each for receiving one of studs 70. Studs 70 are each held in place in holes 68, 74 by a respective nut 78, with studs 70 and nuts 78 together forming connectors connecting first and second subassemblies 12, 16. Connecting plate 72 further includes a radially inner portion 80 connected to damper assembly 18. More specifically, radially inner portion 80 includes a plurality of holes formed therein for receiving rivets 84, which pass through holes in an inertia plate 86 and a first radially outer cover plate 88 of damper assembly 18 to connect connecting plate 72 and inertia plate 86 to cover plate 88. Inertia plate 86 extends radially outward from rivets 84 and cover plate 88 to support a plurality of inertia mass 90 at a radially outer portion 92 thereof. Inertia masses 90 are connected to inertia plate 86 by rivets 92. Inertia plate 86, inertia masses 90 and rivets 92 together form an inertia assembly that is configured in accordance with the performance requirements of drive assembly 10. For drive assemblies with different requirements, the inertia assembly may be modified accordingly, for example by changing the number or the design of the inertia masses.

Cover plate 88 is connected to a second radially outer cover plate 94 by a plurality of sheet metal rivets 96. Radially outer cover plates 88, 94 support a plurality of radially outer springs 98 axially therebetween. Radially inside of springs 98, damper assembly 18 further includes a first radially inner cover plate 100 substantially radially aligned with first radially outer cover plate 88 and a second radially inner cover plate 102 substantially radially aligned with second radially outer cover plate 94. A first friction washer 104 is sandwiched axially between and contacting a radially extending surface of cover plate 88 and cover plate 100 and a second friction washer 106 is sandwiched axially between and contacting a radially extending surface of cover plate 94 and cover plate 102 such that cover plates 88, 94 are together rotatable with respect to cover plates 100, 102 with limited friction. Radially inner cover plates 100, 102 are held together in a spaced configuration by connectors 107 and support a plurality of radially inner springs 108, which are offset radially inside of radially outer springs 98, axially therebetween.

Damper assembly 18 further includes a drive flange 100 axially between cover plates 88, 100, which are on one-side of drive flange 110, and cover plates 94, 102, which are on the other side of drive flange 110. Drive flange 110 includes a set of radially outer slots 112, in which springs 98 are received, and a set of radially inner slots 114, in which springs 108 are received. At a radially outer end thereof, drive flange 110 includes a plurality of circumferentially spaced tabs 116 configured for contacting sheet metal rivets 96 to act as overload stops. Drive flange 110 is driven by outer cover plates 88, 94 via springs 98 and in turn drives inner cover plates 100, 102 via springs 108. Radially inner ends of one or both of cover plates 100, 102 are connected to a hub 118. Hub 118 includes an inner splined surface configured for connecting to a transmission input shaft 120, allowing cover plates 100, 102 to drive transmission input shaft 120 via hub 122. Axially between at a radially inner end of drive flange 110 and a radially inner end of cover plate 102, an idler spring 122 is provided.

A method of forming drive assembly 10 includes forming first subassembly 12 and second subassembly 16 separate from one another, connecting first subassembly 12 to engine crank 21 via bolts 22, then connecting second subassembly 16 to first subassembly 12 via the connectors formed by studs 70 and nuts 78.

Figure 2:
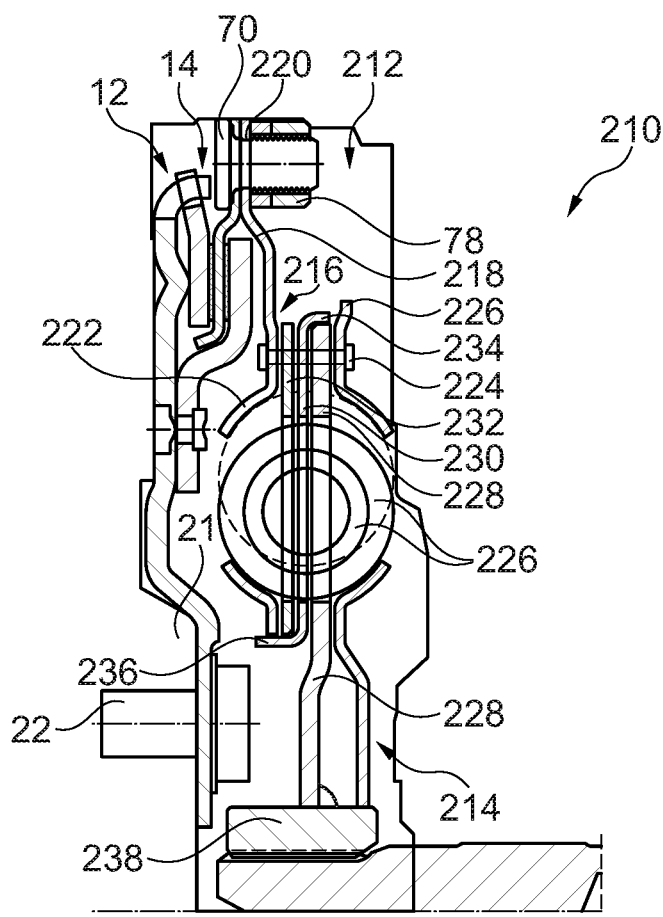
FIG. 2 shows a cross-sectional side view of a dry drive assembly for a motor vehicle drive train in accordance with another embodiment of the present invention.

FIG. 2 shows a cross-sectional side view of a dry drive assembly 210 for a motor vehicle drive train in accordance with another embodiment of the present invention. Drive assembly 210 is configured in the same manner as drive assembly, expect that second subassembly 16 including damper assembly 18 is replaced by subassembly 212 including an inline series damper assembly 214. Accordingly, drive assembly 210 includes first subassembly 12 including torque limiting integrated clutch 14 and second subassembly 212 including a damper assembly 214.

Figure 3:
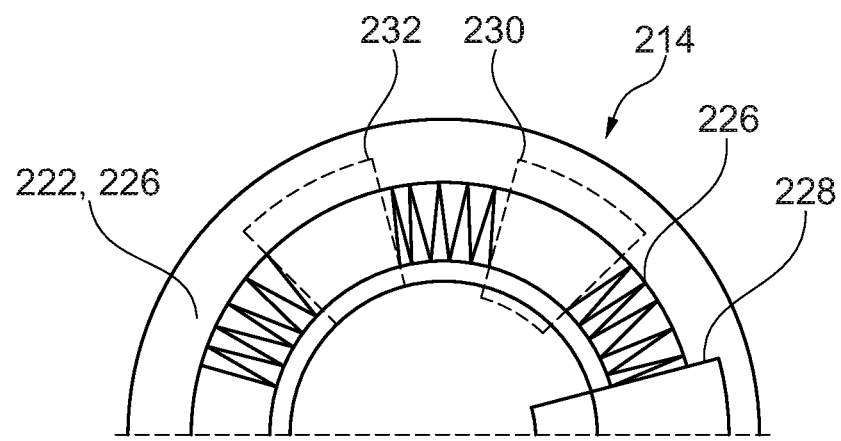
FIG. 3 schematically shows a half cross-section of a damper assembly of the drive assembly shown in FIG. 2.

Second subassembly 212 includes a plate 216 including a radially outer portion forming a connecting plate 218 of second subassembly 212. Connecting plate 218 includes a plurality of holes 220, each for receiving one of studs 70. Plate 216 also includes a radially inner portion forming a cover plate 222 of damper assembly 214. Cover plate 222 includes a plurality of holes formed therein for receiving sheet metal rivets 224, which connect cover plate 216 to a second cover plate 226. Cover plates 216, 226 support a plurality of circumferentially aligned springs 226 axially therebetween. In this embodiment, a first spring set includes three springs 226 in series connection and a second spring set includes three springs 226 in series connection, enabling a very low rate. FIG. 3 schematically shows a half cross-section of damper assembly 214, illustrating one of the two sets of springs 226.

Axially between cover plates 216, 226, damper assembly 214 includes a drive flange 228 and two intermediate flanges 230, 232. First intermediate flange 230 includes an outer centering feature 234 on an outer diameter thereof and an inner centering feature 236 on an inner diameter thereof for assembly purposes. Outer centering feature 234 extends axially at an outer diameter of drive flange 228 to center first intermediate flange 230 on drive flange 228 and inner centering feature 236 extends axially at inner diameters of second intermediate flange 232 and cover plate 222 to center first intermediate flange 230 and second intermediate flange on cover plate 216. A radially inner end of drive flange 228 is fixed to a hub 238. Hub 238 includes an inner splined surface configured for connecting to transmission input shaft 124.

A method of forming drive assembly 210 includes forming first subassembly 12 and second subassembly 212 separate from one another, connecting first subassembly 12 to engine crank 21 via bolts 22, then connecting second subassembly 212 to first subassembly 12 via the connectors formed by studs 70 and nuts 78.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly for a motor vehicle drive train comprising:
   a first subassembly configured for connecting to an engine crank, the first subassembly including a slip clutch plate, the slip clutch plate including friction material and a radially outer portion radially outside of the friction material, the first subassembly including a drive plate configured for connecting to the engine crank and a biaser contacting the friction material, the first subassembly being configured such that once a torque on the drive plate reaches or exceeds a predetermined value, forces exerted on the slip clutch plate exceed a force applied by the biaser and the slip clutch plate slips with respect to the drive plate; and
   a second subassembly connected to the first subassembly via the radially outer portion of the slip clutch plate, the second subassembly including a damper assembly.

2. The drive assembly as recited in claim 1 wherein the biaser is connected to a radially outer end of the drive plate.

3. The drive assembly as recited in claim 2 wherein the first subassembly includes a support plate fixed to the drive plate, the biaser biasing the slip clutch plate against the support plate.

4. The drive assembly as recited in claim 3 wherein the drive plate includes a protrusion contacting an engine side radially extending surface of the biaser to maintain the biaser in radial alignment during engagement of the slip clutch plate.

5. The drive assembly as recited in claim 4 wherein the protrusion is an annular protrusion.

6. The drive assembly as recited in claim 3 wherein the biaser is a diaphragm spring.

7. The drive assembly as recited in claim 3 wherein the support plate is fixed to the drive plate radially inside of the slip clutch plate.

8. The drive assembly as recited in claim 1 wherein the damper assembly includes at least two cover plates supporting at least one set of springs, the radially outer portion of the slip clutch plate being connected to one of the cover plates via a connecting plate.

9. The drive assembly as recited in claim 8 wherein the radially outer portion of the slip clutch plate includes holes and the connecting plate includes holes, the holes of the radially outer portion of the slip clutch plate and the holes of the connecting plate receive connectors to fix the first subassembly and the second subassembly together.

10. The drive assembly as recited in claim 8 wherein the damper assembly includes an inertia assembly radially outside of the cover plates.

11. The drive assembly as recited in claim 1 wherein the slip clutch plate is axially offset from the damper assembly.

12. The drive assembly as recited in claim 1 wherein the first subassembly includes a support plate and the friction material of the slip clutch plate contacts the support plate, the radially outer portion of the slip clutch plate extending further radially outward than the support plate.

13. The drive assembly as recited in claim 1 wherein the second subassembly includes a connecting plate, the radially outer portion of the slip clutch plate being fixed to a radially outer portion of the connecting plate by fasteners.

14. The drive assembly as recited in claim 13 wherein the slip clutch plate contacts a support plate of the first subassembly, the radially outer portion of the connecting plate extending further radially outward than the support plate.

15. A method of forming a drive assembly for a motor vehicle drive train comprising:
    forming a first subassembly configured for connecting to an engine crank, the first subassembly including a slip clutch plate;
    forming a second subassembly including a damper assembly; and
    after the forming of the first subassembly and after the forming of the second subassembly, connecting to the first subassembly to the second subassembly via a radially outer portion of the slip clutch plate,
    wherein the forming the first subassembly includes connecting a biaser to a drive plate configured for connecting to an engine crank, the first subassembly being configured such that once a torque on the drive plate reaches or exceeds a predetermined value, forces exerted on the slip clutch plate exceed a force applied by the biaser and the slip clutch plate slips with respect to the drive plate, a radially outer end of the biaser drivingly contacting a radially outer end of the drive plate.

16. The method as recited in claim 15 wherein the forming the first subassembly includes connecting a plurality of tabs at the radially outer end of the biaser to a plurality of tabs at the radially outer end of the drive plate.

17. The method as recited in claim 16 wherein the forming the first subassembly includes fixing a support plate to the drive plate such that the biaser is biasing the slip clutch plate against the support plate.

18. The method as recited in claim 17 wherein the forming the first subassembly includes providing the drive plate with a protrusion contacting an engine side radially extending surface of the biaser to maintain the biaser in radial alignment during engagement of the slip clutch plate.

19. The method as recited in claim 15 wherein the forming the second subassembly including forming the damper assembly to include at least two cover plates supporting at least one set of springs, the connecting the first subassembly to the second subassembly including connecting the radially outer portion of the slip clutch plate to one of the cover plates via a connecting plate.

20. A drive assembly for a motor vehicle drive train comprising:
    a first subassembly configured for connecting to an engine crank, the first subassembly including a slip clutch plate, the slip clutch plate including friction material and a radially outer portion radially outside of the friction material, the first subassembly including a drive plate configured for connecting to the engine crank and a biaser, the first subassembly being configured such that once a torque on the drive plate reaches or exceeds a predetermined value, forces exerted on the slip clutch plate exceed a force applied by the biaser and the slip clutch plate slips with respect to the drive plate; and
    a second subassembly connected to the first subassembly via the radially outer portion of the slip clutch plate, the second subassembly including a damper assembly,
    wherein the first subassembly includes a support plate and the friction material of the slip clutch plate contacts the support plate, the radially outer portion of the slip clutch plate extending further radially outward than the support plate,
    wherein the friction material of the slip clutch plate is axially between the drive plate and the support plate, the support plate being fixed to the drive plate radially inward from the friction material of the slip clutch plate.

* * * * *